United States Patent
Larish et al.

(10) Patent No.: US 10,039,016 B1
(45) Date of Patent: Jul. 31, 2018

(54) MACHINE-LEARNING-BASED RF OPTIMIZATION

(71) Applicant: Verizon Patent and Licensing Inc., Arlington, VA (US)

(72) Inventors: Bryan Christopher Larish, Belmont, MA (US); Said Soulhi, Boston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/622,147

(22) Filed: Jun. 14, 2017

(51) Int. Cl.
*H04W 4/00* (2018.01)
*H04W 24/02* (2009.01)
*G06N 99/00* (2010.01)
*H04W 24/04* (2009.01)

(52) U.S. Cl.
CPC .......... *H04W 24/02* (2013.01); *G06N 99/005* (2013.01); *H04W 24/04* (2013.01)

(58) Field of Classification Search
CPC .................................................. H04W 24/02
See application file for complete search history.

(56) References Cited

U.S. PATENT DOCUMENTS

| 2016/0165472 A1* | 6/2016 | Gopalakrishnan .... | H04W 24/10 455/67.11 |
| 2017/0063503 A1* | 3/2017 | Liu ....................... | H04L 5/0048 |

* cited by examiner

*Primary Examiner* — Justin Lee

(57) ABSTRACT

A method is provided for obtaining reference signal measurements over a structured interface to support RF optimization via machine learning. The method, performed by a network device, includes identifying a target cluster of cell towers for a radio access network (RAN); generating a model for collecting RAN measurements from mobile communication devices in the target cluster; and sending the model via a structured reference point to client applications on the mobile communication devices. The model may direct collection of and sending of the RAN measurements by the client applications. The method may further include receiving, via the structured reference point, the RAN measurements from the client applications based on the model; and aggregating the RAN measurements to represent aspects of the target cluster based on the model.

20 Claims, 11 Drawing Sheets

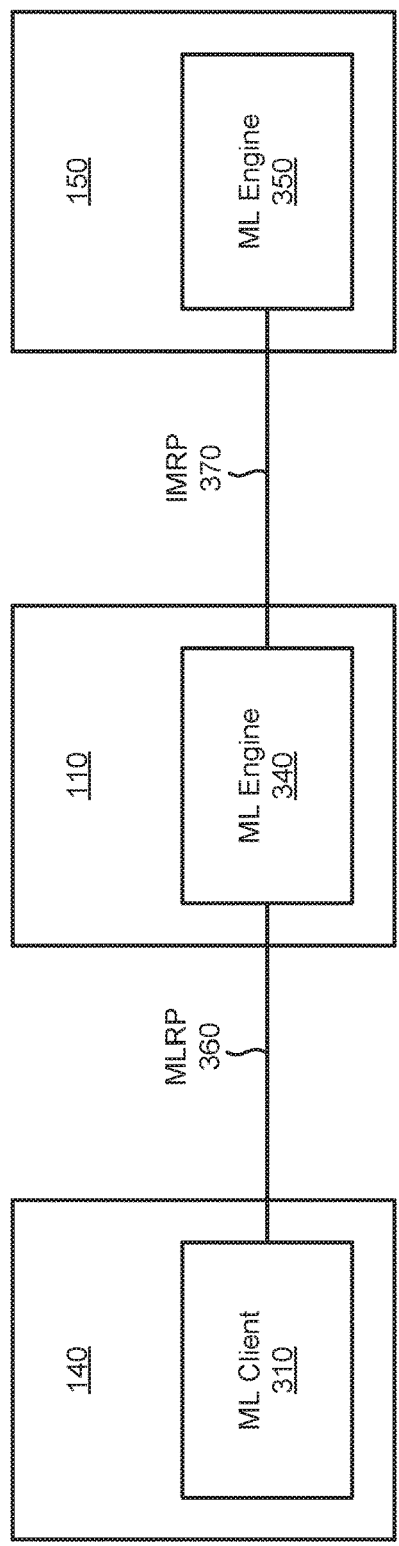

MACHINE-LEARNING-BASED RF OPTIMIZATION

BACKGROUND

Mobile communication devices connect to an access network via a base station. A base station may include a radio frequency (RF) transceiver configured to receive wireless signals from a mobile communication device and to transmit wireless signals to the mobile communication device. Network service providers may seek to maximize the value of base stations and other network components by optimizing use of existing RF resources, such as base station components. RF optimization is typically a complex manual process that involves adjustment of neighboring cell lists and numerous engineering parameters. Furthermore, collection of RF data—and particularly user experience data—to support RF optimization efforts can be a challenge.

BRIEF DESCRIPTION OF THE DRAWINGS

FIG. 3B is a diagram illustrating a different exemplary architecture for machine-learning-based RF optimization according to another implementation described herein;

DETAILED DESCRIPTION OF PREFERRED EMBODIMENTS

The following detailed description refers to the accompanying drawings. The same reference numbers in different drawings may identify the same or similar elements.

Implementations described herein relate to radio resource management using machine learning for RF optimization. Machine-learning entities may employ a client-server architecture to collect reference signal data, obtained by mobile communication devices, for a target cluster of cell towers. Machine-learning algorithms are applied to provide tools for optimization, such as coverage maps for target clusters, fine granular clustering of cell towers, and fine granular clustering of user. Structured reference points between the client and server entities facilitate data exchanges.

Figure 1A:
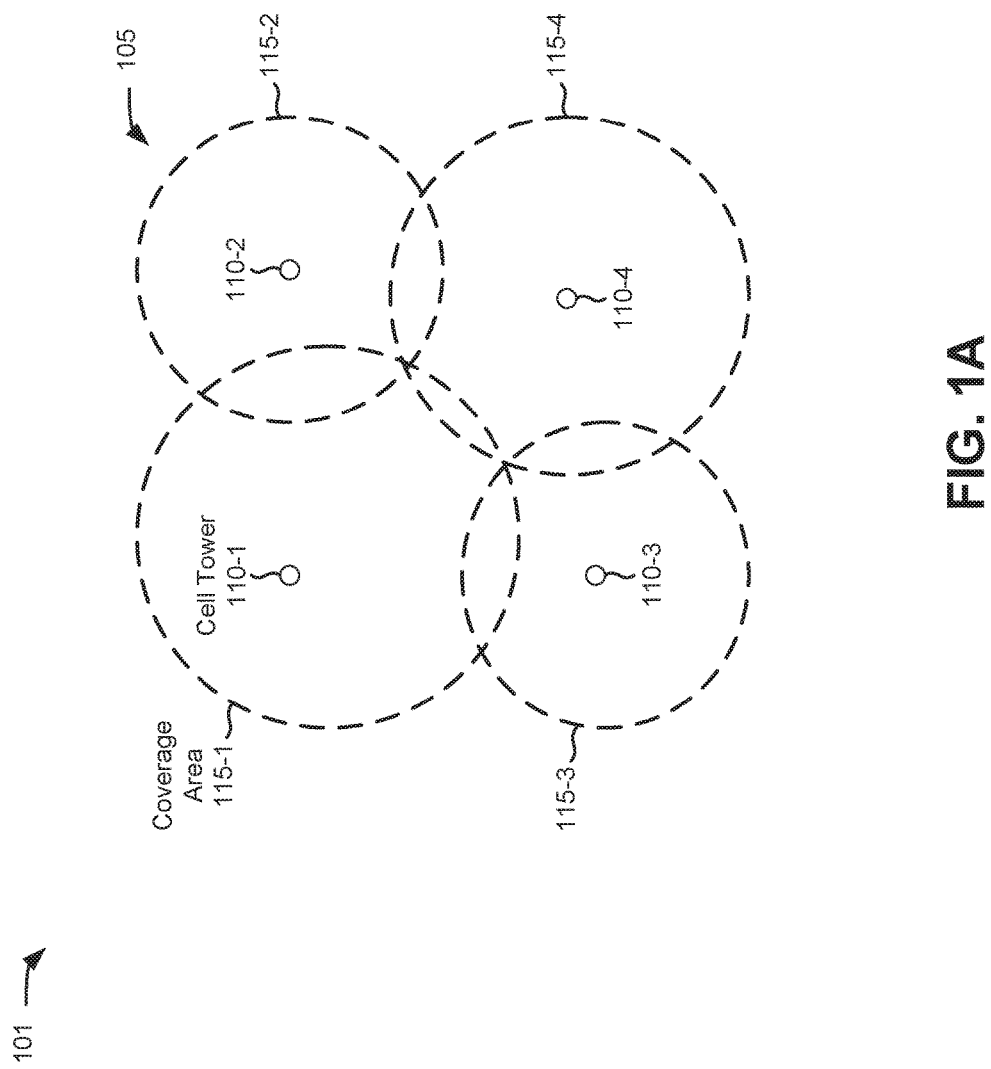
FIG. 1A is a diagram illustrating an exemplary coverage area of a cluster of base stations according to an implementation described herein.

FIG. 1A is a diagram illustrating an exemplary geographic environment 101 including a cluster 105 of base stations according to an implementation described herein. As shown in FIG. 1A, cluster 105 may include individual cellular base stations 110-1 through 110-4 (also referred to herein collectively as cell towers 110 or individually as cell tower 110) with corresponding radio access network (RAN) coverage areas 115-1 through 115-4 (referred to herein collectively as coverage areas 115 or individually as coverage area 115). In some implementations, cell towers 110 may correspond to a Long Term Evolution (LTE) eNodeB or another type of base station. Cell towers 110 may enable user equipment devices, such as mobile communication devices, located within coverage areas 115, to communicate cell towers 110 over networks via wireless signals.

A service provider may deploy hundreds of thousands of cell towers 110 in a wireless network. In some areas, cell towers 110 and corresponding users may be assigned into logical groups, referred to as clusters, according commonalties such as channel conditions, position, applications, and hardware resources. Assignment of cell towers 110 into clusters 105 can be a complex decision that may include identifying groups of similar cell sectors, identifying groups of customer circuits with similar traits, etc. In clustering cell towers, a service provider may aim to adjust various cell tower 110 parameters to improve network performance, network load distribution, and user satisfaction. This optimization may include balancing competing performance metrics such as minimizing power consumption, maximizing available RF spectrum, meeting fluctuating bandwidth demands, outage recovery, testing, etc.

Figure 1B:
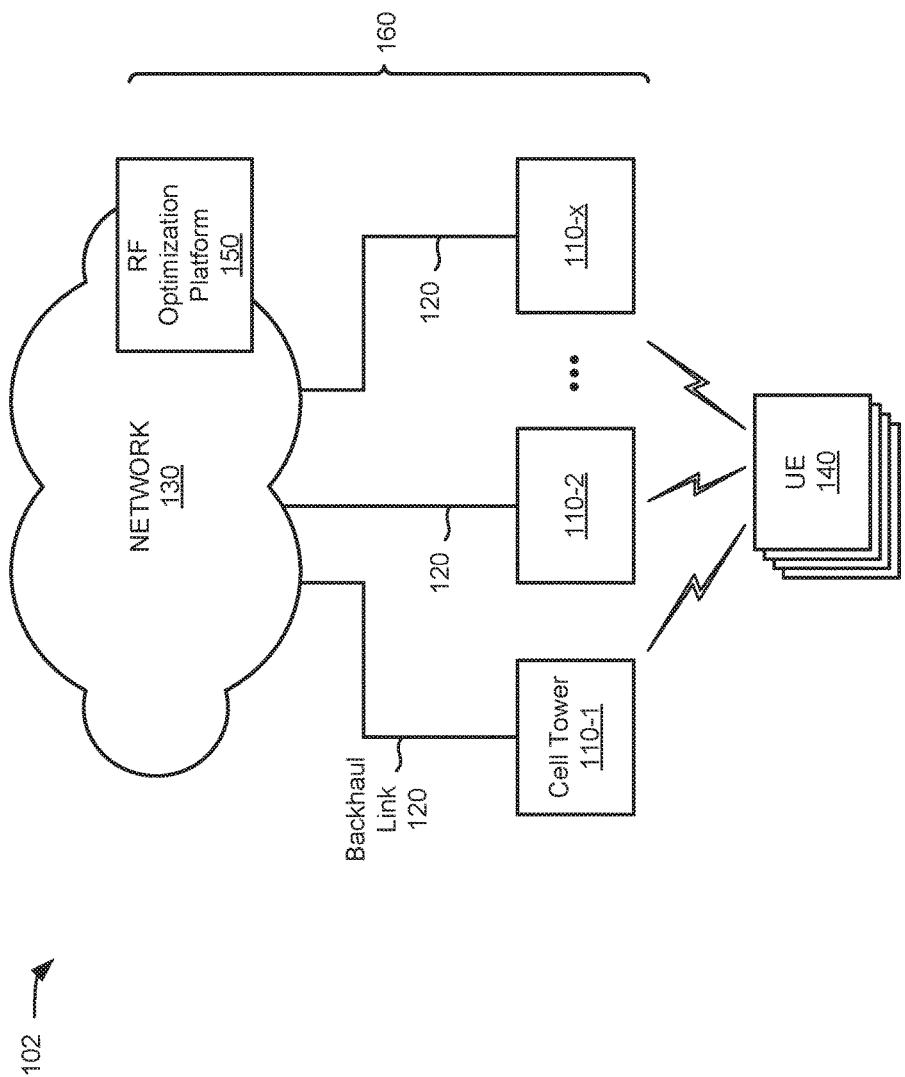
FIG. 1B is a diagram illustrating an exemplary environment according to an implementation described herein.

FIG. 1B a diagram illustrating an exemplary network environment 102 associated with geographic environment 101 of FIG. 1A. As shown in FIG. 1B, network environment 102 may include cell towers 110, backhaul links 120 (referred to herein collectively as links 120 or individually as link 120), network 130, user equipment (UE devices 140 (also referred) to herein individually as "UE 140"), and an RF optimization platform 150.

Cell tower 110 (also referred to herein as a "base station 110") may include a device that handles wireless transmissions to and from UE 140 to provide access to and from network 130. Cell tower 110 may include antennas and related transceiver circuitry for connecting to UE 140 over a wireless access network. For example, base station 110 may include a wireless station, such as an eNodeB, a Node B in a UMTS, a base transceiver station (BTS) in a Global System for Mobile Communications (GSM) system, etc. In one particular implementation, cell tower 110 may utilize LTE standards operating in a 700 MHz frequency band.

According to an implementation, antennas for cell tower 110 may include a remote electrical tilting (RET) antenna. The RET antenna can adjust the electrical tilt angle of a variable tilt antenna through electro-mechanical actuators (such as a stepper motor). The RET antenna can receive tilt commands over a UTRAN Iuant interface (through the coaxial cables), for example, and move the tilt actuator appropriately. Additionally, antenna power levels may be remotely controlled. Thus, coverage areas 115 (also known as cells) and RAN capacity may be optimized through modification of antenna tilts and power, individually or in combination.

Cell tower 110 may connect to network 130 via backhaul link 120. According to an implementation, backhaul link 120 may include a standardized reference point (or standardized interface) for machine-learning-based RF optimization.

Network 130 may include one or more circuit-switched networks and/or packet-switched networks. For example, network 130 may include a local area network (LAN), a wide area network (WAN), a metropolitan area network (MAN), a Public Switched Telephone Network (PSTN), an ad hoc network, an intranet, the Internet, a fiber optic-based network, a wireless network, and/or a combination of these or other types of networks.

UE 140 may include any mobile communication device configured to communicate with a base station (e.g., cell tower 110) via wireless signals. For example, UE 140 may include a portable communication device (e.g., a mobile phone, a smart phone, a global positioning system (GPS) device, and/or another type of wireless device); a telephone terminal; a personal computer or workstation; a server device; a laptop, tablet, or another type of portable computer; a media playing device; a portable gaming system; a machine-type communication (MTC) device; an Internet-of-Things device; and/or any type of mobile device with wireless communication capability.

RF optimization platform 150 may include one or more network devices or computing devices. RF optimization platform 150 may include a user interface for users (e.g., network managers) to provide queries, identify geographical boundaries, visualize coverage maps, etc. As described further herein, RF optimization platform 150 may include an ML server (or ML engine) to manage collection of network data, model clusters, and recommend/implement optimization measures. In one implementation, RF optimization platform 150 may be a distributed component. In one implementation, RF optimization platform 150 may automatically implement changes in network settings (e.g., cell tower antenna tilt, cell power settings, inactivity timers, etc.) based on machine learning algorithms. In another implementation, RF optimization platform 150 may optimize energy efficiency by switching off sites and/or carriers during off peak hours. The combination of cell towers 110, links 120, and network 130 may be referred to as a self-organizing network (SON) 160.

Although FIGS. 1A and 1B show exemplary components of geographic environment 101 and network environment 102, in other implementations, environments 101/102 may include fewer components, different components, differently arranged components, or additional components than depicted in FIG. 1A or 1B. Additionally or alternatively, one or more components of environments 101/102 may perform functions described as being performed by one or more other components of geographic environment 101 and network environment 102.

Figure 2:
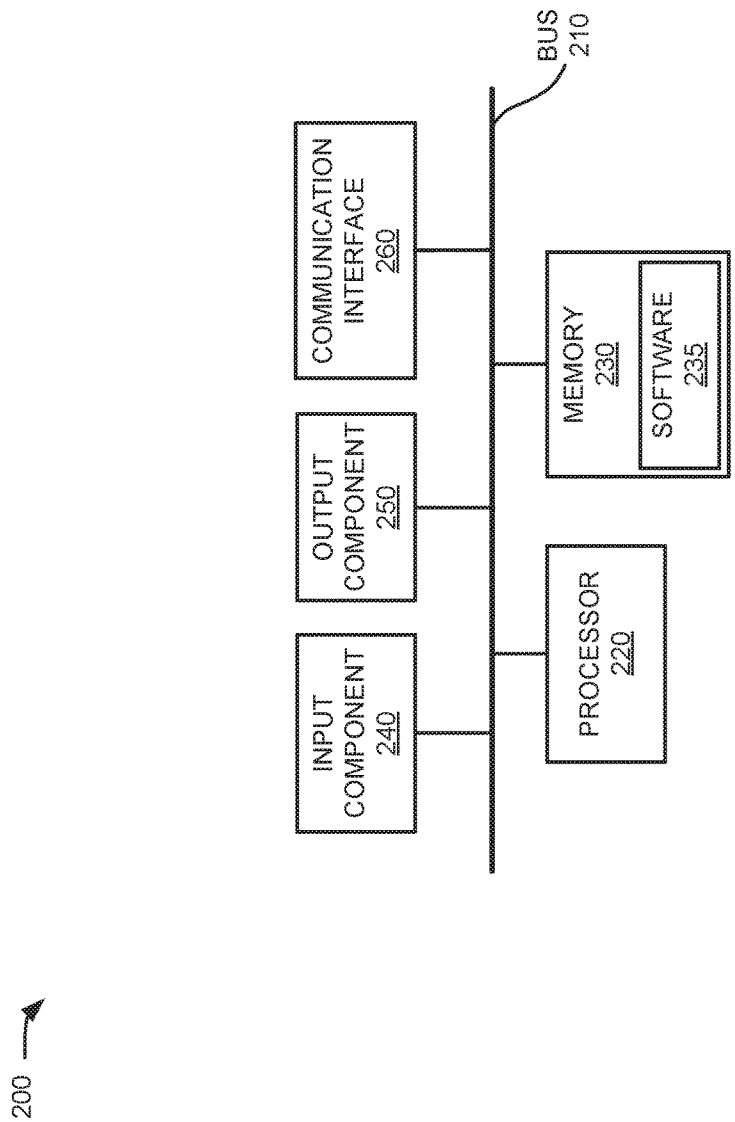
FIG. 2 is a diagram illustrating exemplary components of a device that may be included in the environment of FIG. 1B.

FIG. 2 is a diagram illustrating exemplary components of a device 200. Device 200 may correspond, for example, to a component of cell tower 110, UE 140, RF optimization platform 150, or another component of network environment 102. Device 200 may include a bus 210, a processor 220, a memory 230 with software 235, an input component 240, an output component 250, and a communication interface 260.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Software 235 includes an application or a program that provides a function and/or a process. Software 235 may also include firmware, middleware, microcode, hardware description language (HDL), and/or other form of instruction. By way of example, with respect to the network elements that include logic to provide machine-learning-based RF optimization, these network elements may be implemented to include software 235. Additionally, for example, UE 140 may include software 235 (e.g., an application to communicate with RF optimization platform 150, etc.) to perform tasks as described herein.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of radio frequency (RF) signals. For example, communication interface 260 may include one or more antennas to transmit and/or receive RF signals over the air. Communication interface 260 may, for example, receive RF signals and transmit them over the air to UE 140/cell tower 110, and receive RF signals over the air from cell tower 110/UE 140. In one implementation, for example, communication interface 260 may communicate with a network and/or devices connected to a network. Alternatively or additionally, communication interface 260 may be a logical component that includes input and output ports, input and output systems, and/or other input and output components that facilitate the transmission of data to other devices.

Device 200 may perform certain operations in response to processor 220 executing software instructions (e.g., software 235) contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. In these situations, device 200 may be a "headless" device that does not include input component 240. Additionally, or alternatively, one or more operations described as being performed by a particular component of device 200 may be performed by one or more other components, in addition to or instead of the particular component of device 200.

Figure 3A:
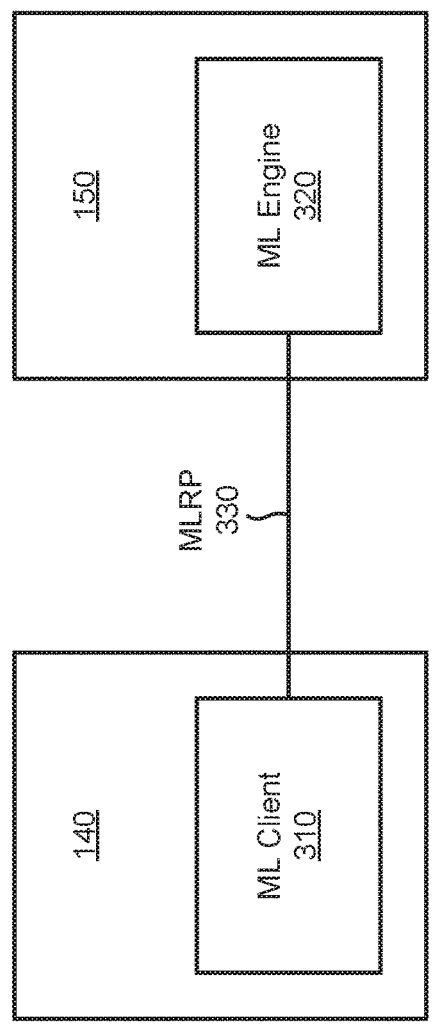
FIG. 3A is a diagram illustrating an exemplary architecture for machine-learning-based RF optimization according to an implementation described herein.

FIG. 3A is a diagram illustrating exemplary logical components of UE 140 and RF optimization platform 150 according to an implementation described herein. The functional components of UE 140 and RF optimization platform 150 may be implemented, for example, via processor 220 executing instructions from memory 230. As shown in FIG. 3A, UE 140 may include a machine learning (ML) client 310 and RF optimization platform 150 may include an ML engine 320. ML client 310 and ML engine 320 may exchange communications via a machine learning reference point (MLRP) 330 that defines protocols for identifying, collecting, and sending data to support RF optimization platform 150.

ML client 310 may include an application (e.g., software or a combination of hardware and software) configured to monitor RF communications data for UE 140, such as key performance indicators (KPIs) and other measurements related to RF communications. For example, ML client 310 may collect Reference Signal Received Power (RSRP), Reference Signal Received Quality (RSRQ), and/or Received Signal Strength Indicator (RSSI) data in conjunction with a location of UE 110. In one implementation, ML client 310 may collect RF communication data only for particular cell towers 110 as instructed by ML engine 320. For example, ML engine 320 may provide a particular model or instructions, which ML client 310 can interpret to provide corresponding UE measurement reports. In another implementation, ML client 310 may collect RF communication data for all cell tower 110 connections. ML client 310 may send the communications data to ML engine 320 using, for example, MLRP 330.

In one implementation, the RF communications data may provide information to build coverage maps (e.g., for cluster 105), identify cell towers 110 for a cluster 105, identify clustering of users, etc. The collection and sending of RF communication data by ML client 310 allows for use of data related to the user experience rather than on network performance.

ML engine 320 may apply machine learning, including using neural networks and deep learning, to identify and model target clusters in a RAN based on information obtained via cell towers 110, UEs 140, and/or other network entities. For example, training data from well-behaving clusters may be processed using machine learning techniques/algorithms. The machine learning processing may be used to identify parameters of interest, such as channel conditions, position, applications, and hardware resources, to identify commonalties. The parameters may be applied to identify target clusters of cell towers 110 or clusters of UEs 140 and map coverages within the cluster. ML engine 320 may use the coverage information to identify settings for improving network performance, network load distribution, and user satisfaction.

ML engine 320 may direct collection of UE measurement reports from UEs 110. For example ML engine 320 may instruct UE 110 to collect and report RSRP and RSRQ data when connected to one or more designated cell towers 110 (e.g., a cell tower 110 within a test area or model area) or when within a designated geographic area. ML engine 320 may receive the UE measurement reports from ML client 310 and apply the data to models and/or classification algorithms to generate a coverage map.

FIG. 3B is a diagram illustrating exemplary logical components of cell tower 110, UE 140, and RF optimization platform 150 according to an implementation described herein. The functional components of cell tower 110, UE 140, and RF optimization platform 150 may be implemented, for example, via processor 220 executing instructions from memory 230. As shown in FIG. 3B, cell tower 110 may include an ML engine 340, UE 140 may include ML client 310, and RF optimization platform 150 may include ML engine 350. ML client 310 and ML engine 320 may communicate via an MLRP 360, and ML engine 340 and ML engine 350 may communicate via an inter-model reference point (IMRP) 370. MLRP 360 may define protocols for identifying, collecting, and sending data between cell tower 110 and UE 140. IMRP 370 may identify protocols for exchanging data for machine learning operations between cell tower 110 and RF optimization platform 150.

Similar to the description in FIG. 3A, in the arrangement of FIG. 3B, ML client 310 may be configured to monitor RF communications data for UE 140. ML client 310 may send the communications data to ML engine 340 (e.g., in cell tower 110) using, for example, MLRP 360.

In the configuration of FIG. 3B, functions of ML engine 320 described above may be distributed among ML engines 340 and 350. For example, ML engine 340 may consolidate UE measurement reports (e.g., according to a particular model) for all UEs 140 in a corresponding coverage area 115. ML engine 350 may receive the consolidated UE measurement reports from each cell tower 110 (e.g., ML engine 340) in a cluster 105 of interest (referred to hereafter as "target cluster 105"). ML engines 340 and 350 may exchange communications using, for example, IMRP 370. In another implementation, ML engine 340 may perform some functions of ML client 310.

Figure 4:
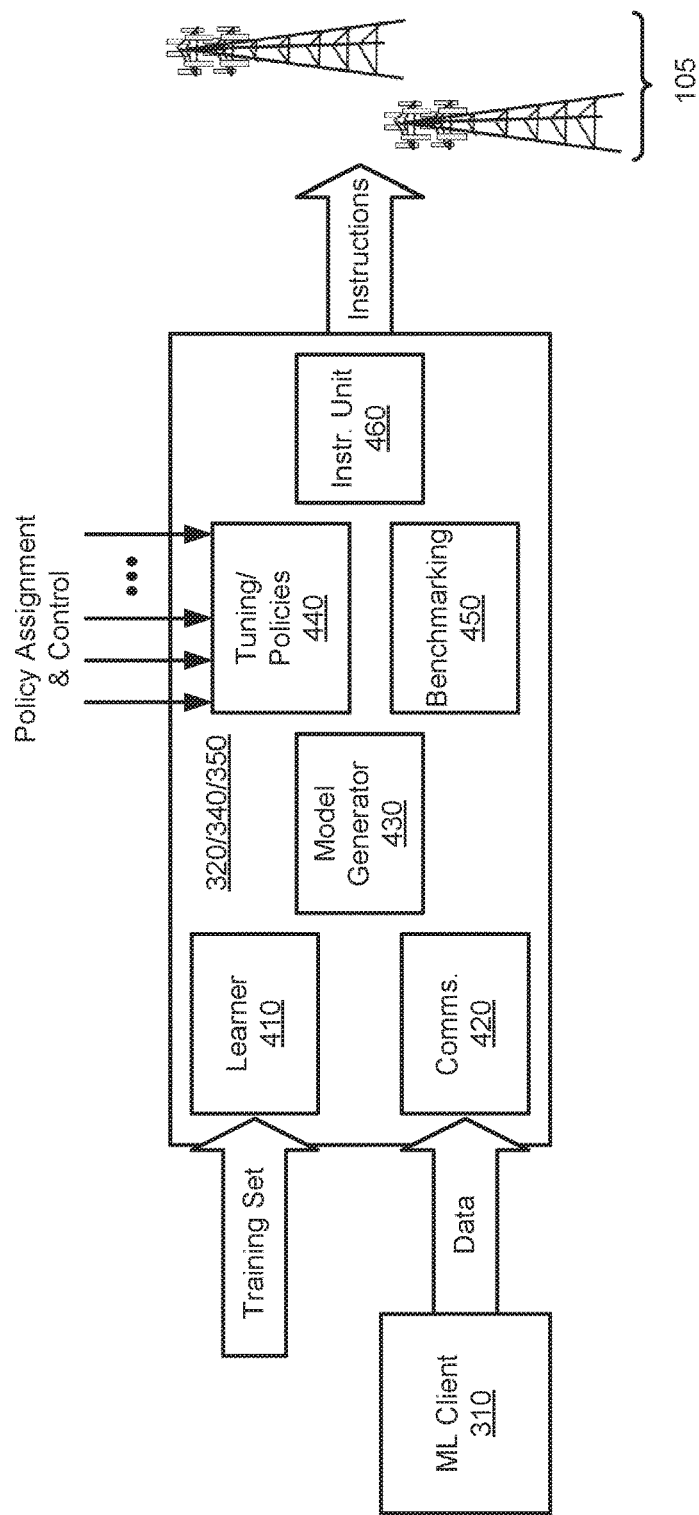
FIG. 4 is a diagram illustrating exemplary logical components of the machine learning engines of FIGS. 3A and 3B.

FIG. 4 is a diagram illustrating exemplary communications and logical components of one or more of ML engines 320/340/350. As shown in FIG. 4, ML engine 320/340/350 may include a learner 410, a network communications unit 420, a model generator 430, a tuning/policies module 440, a benchmarking module 450, and an instruction unit 460.

Learner 410 may receive training data from a well-performing group of cell towers (referred to as a "golden cluster") and use machine learning techniques to generate training models from the training data. The training model may be extracted using a training data set from the golden cluster. ML engine 320/340/350 may extract a model from the training data set with applications to monitoring, optimization, and auto tuning network functionalities. For example, a model may be directed to coverage and capacity optimization, energy efficiency, interference coordination (e.g., between cell towers), end-to-end optimization, etc. The model may provide closed form expressions that approximate the functional relations between KPIs and radio resource monitoring (RRM) parameters. The model can help anticipate the behavior of a network sub-system to new values of RAN parameters.

In one implementation, learner 410 may implement one or more deep learning frameworks. Learner 410 attempts generalize, or perform accurately on new examples after being trained on a finite training data set. Learner 410 may automate the learning process through generalization based on new examples fetched automatically from well-behaving sites (e.g., golden clusters). In contrast with conventional machine learning, learner 410 may perform cross-validation through network performance and policies. Learning performance from training data is domically linked to network performance through use of a probabilistic function. As described further herein, for example, benchmarking module 450 may inform learner 410 of any KPI degradation to signal a need to improve the learning performance.

Network communications unit 420 may manage collection of network data from UEs 140. For example, network communications unit 420 may provide instructions to ML clients 310 directing data collection for some or all capable UEs 140 connected with a cell tower 110. Network communications unit 420 may receive from UEs 140 measurements related to RF communications and process data for inclusion with optimization models.

Model generator 430 may apply data from target clusters to models from learner 410. For example, model generator 430 may apply data from UE 140 and other network data (e.g., relevant to target cluster 105) to generate an RRM model for target cluster 105. The RRM model may be used to identify network optimizations, such as antenna tilts, antenna power, efficiency, etc.

Tuning/policies module 440 may receive policies and controls on a per-cell basis. For example, tuning/policies module 440 may obtain policies from a network element in network 130 for cell towers 110 that are part of a target cluster 105. Tuning/policies module 440 may evaluate policies and controls for each cell tower 110 against the RRM model for compliance.

Benchmarking module 450 may compare the RRM model against existing data from target cluster 105 to verify that application of the RRM model will provide desired optimization (e.g., reduce interference, reduce overshooting, reduce handovers between cell towers 110, etc.). For example, benchmarking module 450 may monitor KPIs and identify relevant (e.g., statistically significant) deviations in the data. In one implementation, benchmarking module 450 may dynamically link the learning performance of learner 410 to the target cluster 105 performance while benchmarking different clusters/regions. In another implementation, a probability function for one or more KPIs may be applied to actual network data (e.g., received from ML clients 310) to assess viability of the RRM model. The probability function may predict, for example, RRC drops or session drops, given other network parameters. Thus, learning performance can be improved through cross-validation using the benchmarking data, instead of simply relying on previously-collected training data.

Instruction unit 460 may generate instructions for implementation of changes to SON 160 (e.g., cell towers 110, etc.). For example, instruction unit 460 may provide instructions to be implemented by other network elements, such as an operation support system (OSS), based on optimizations determined from model generator 430. In another implementation, instruction unit 460 may provide instruction signals to an OSS and/or instruction text (e.g., email, text message, instant message, etc.) to site operators to manually adjust RAN parameters, such as antenna tilt angles, power levels, etc. In still another implementation, instruction unit 460 may provide instructions for energy-savings, such as switching off cell towers and/or carriers during off peak hours. In still other implementations, instruction unit 460 may provide instructions directed to improving/reducing cell interference.

Although FIG. 4 shows exemplary logical components of ML engines 320/340/350, in other implementations, ML engines 320/340/350 may include fewer logical components, different logical components, or additional logical components than depicted in FIG. 4. Additionally or alternatively, one or more logical components of may perform functions described as being performed by one or more other logical components.

Figure 5:
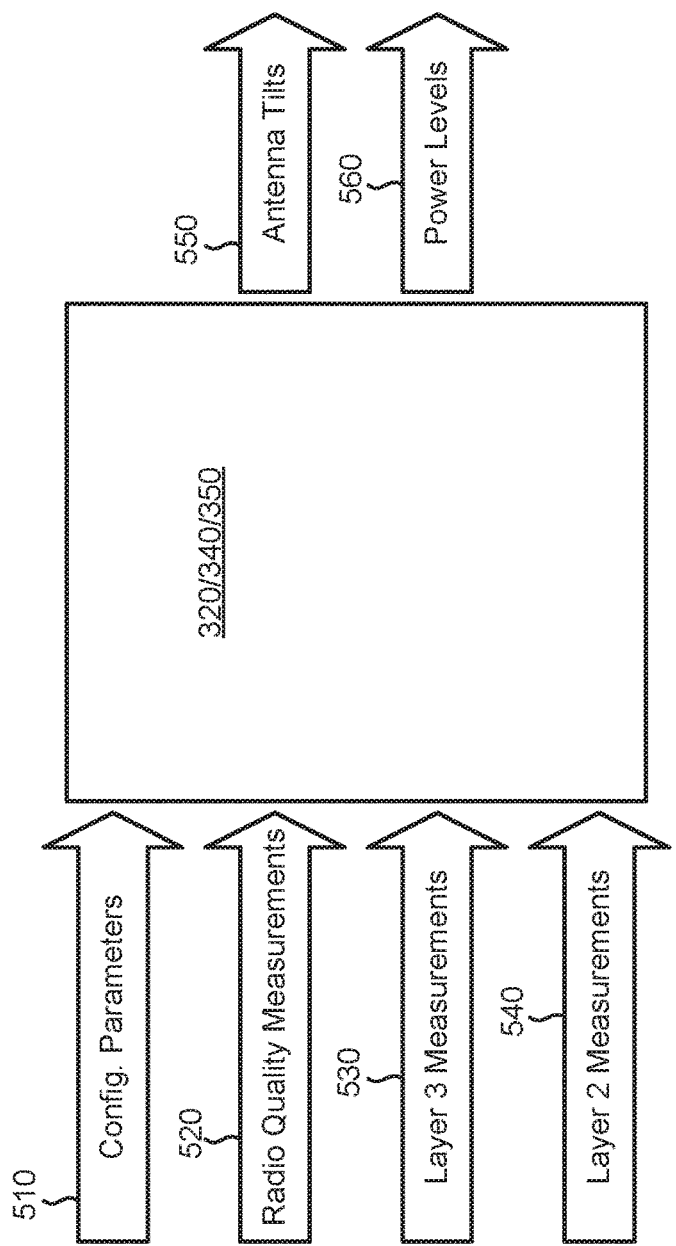
FIG. 5 is a diagram illustrating exemplary input features and output features for the machine learning engines of FIGS. 3A and 3B, according to an implementation.

FIG. 5 is a diagram illustrating exemplary input features and output features for ML engine 320/340/350, according to an implementation. As shown in FIG. 5, input features may include configuration parameters 510, radio quality measurements 520, Layer 3 measurements 530, and Layer 2 measurements 540. As further shown in FIG. 5, output features may include antenna tilts 550 and power levels 560. The input features may be obtained, for example, from cell towers 110 in a golden cluster training set or a target cluster training set. The output features may be determined by RF optimization platform using ML engines 320/340/350.

Configuration parameters 510 may include, for example, power, timers, cell ranges, and transmission parameters. Power may include parameters for Physical Uplink Control Channel (PUCCH) transmission (Tx) power. Timers may include parameters for uplink time alignment, inactivity timers, hysteresis timers, etc. Cell ranges may include parameters defining the maximum distance from the base station where a connection to a UE can be setup and/or maintained (e.g., coverage area 115). Transmission parameters may include, for example, parameters for uplink (UL) or downlink (DL) transmission bandwidth.

Radio quality measurements 520 may include, for example, received interference power and power measurements. Layer 3 measurements 530 may include measurements for network layer 3 in the Open Systems Interconnection (OSI) model, such as radio resource control (RRC) measurements, context establishment usage, Radio Access Bearer (RAB) usage, and handover (HO) measurements. Layer 2 measurements 540 may include measurements for network layer 2 in the OSI model, such as physical resource block (PRB) usage and numbers of active UEs (e.g., UEs 140).

Antenna tilts 550 may include orientation/alignment information for an antenna associated with cell tower 110. In one implementation, antenna tilts 550 may be calculated to provide an optimal coverage area 115 for cell tower 110 without creating interference with other coverage areas. Power levels 560 may include transmit power levels for antennas associated with cell tower 110. Similar to the antenna tilts, power levels 560 may be calculated to provide an optimal coverage area 115 for cell tower 110 without creating interference in other coverage areas.

Although FIG. 5 shows exemplary input and output features of ML engines 320/340/350, in other implementations, ML engines 320/340/350 may use fewer, different, or additional features than depicted in FIG. 5.

Figure 6:
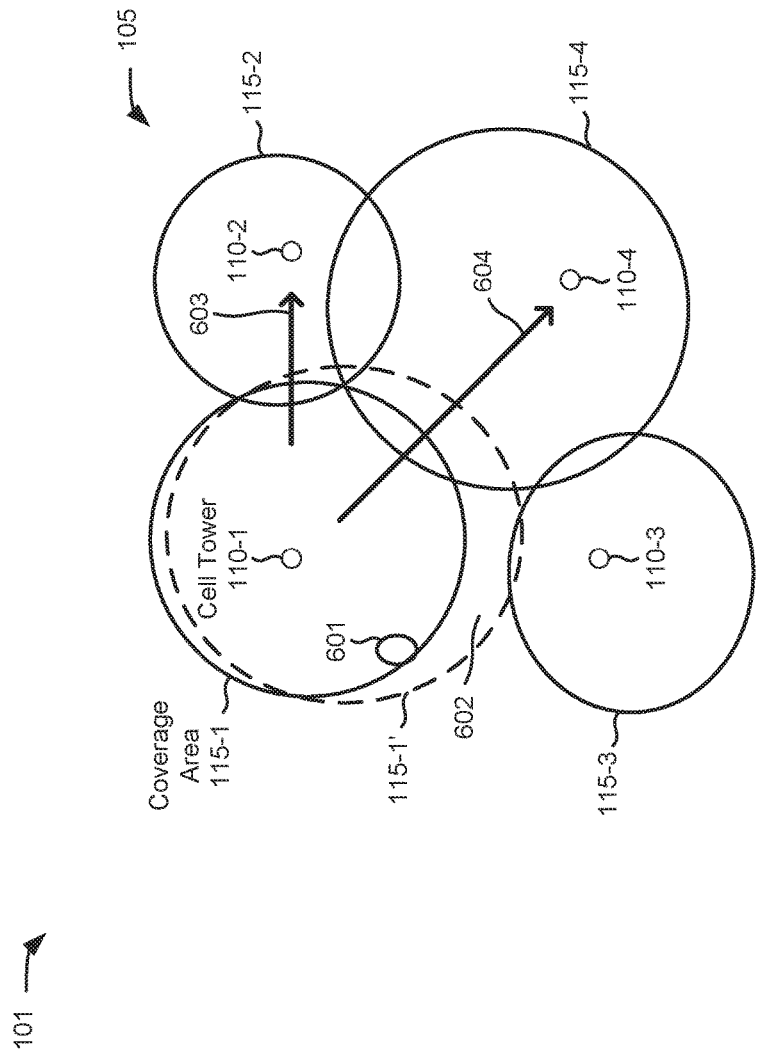
FIG. 6 is a schematic illustrating how instructions from the machine learning engines of FIGS. 3A and 3B affect a target cluster.

FIG. 6 is a schematic illustrating how instructions from ML engine 320/340/350, when implemented, can affect a target cluster. As shown in FIG. 6, target cluster 105 may include cell towers 110-1 through 110-4 with corresponding coverage areas 115-1 through 115-4. Assume in FIG. 6 that instructions to modify a tilt of one or more RET antennas at cell tower 110-1 change coverage area 115-1 of cell tower 110-1 to coverage area 115-1'. A combination of different results may be seen in target cluster 105.

For example, the change from coverage area 115-1 to coverage area 115-1' may eliminate a coverage hole 601 that was present in coverage area 115-1. The change from coverage area 115-1 to coverage area 115-1' may also compensate for a poor inter-cell coverage area 602 that was present between coverage areas 115-1 and 115-3. Conversely, the change from coverage area 115-1 to coverage area 115-1' may increase interference 603 on neighboring cell tower 110-2. Also, the change from coverage area 115-1 to coverage area 115-1' may result in overshooting 604 into coverage area 115-4.

ML engines 320/340/350 may balance these results of modifying antenna tilts (and other RAN adjustments) to optimize target cluster 105 and other clusters using application of models described above. Dynamic evaluation of KPIs (e.g., by benchmarking module 450) may be used to validate and/or improve target cluster modeling. In the context of validating antenna tilts, examples of KPIs may include HO execution failure thresholds, E-UTRAN Radio Access Bearer (eRAB) retainability or failure thresholds, context drop or context setup thresholds, RRC connection drops or RRC failed attempts, total number of connections, and various uplink and downlink channel measurements. In one implementation, ML engine 320/340/350 may apply a probabilistic function to other network measurements to predict a KPI value.

Figure 7:
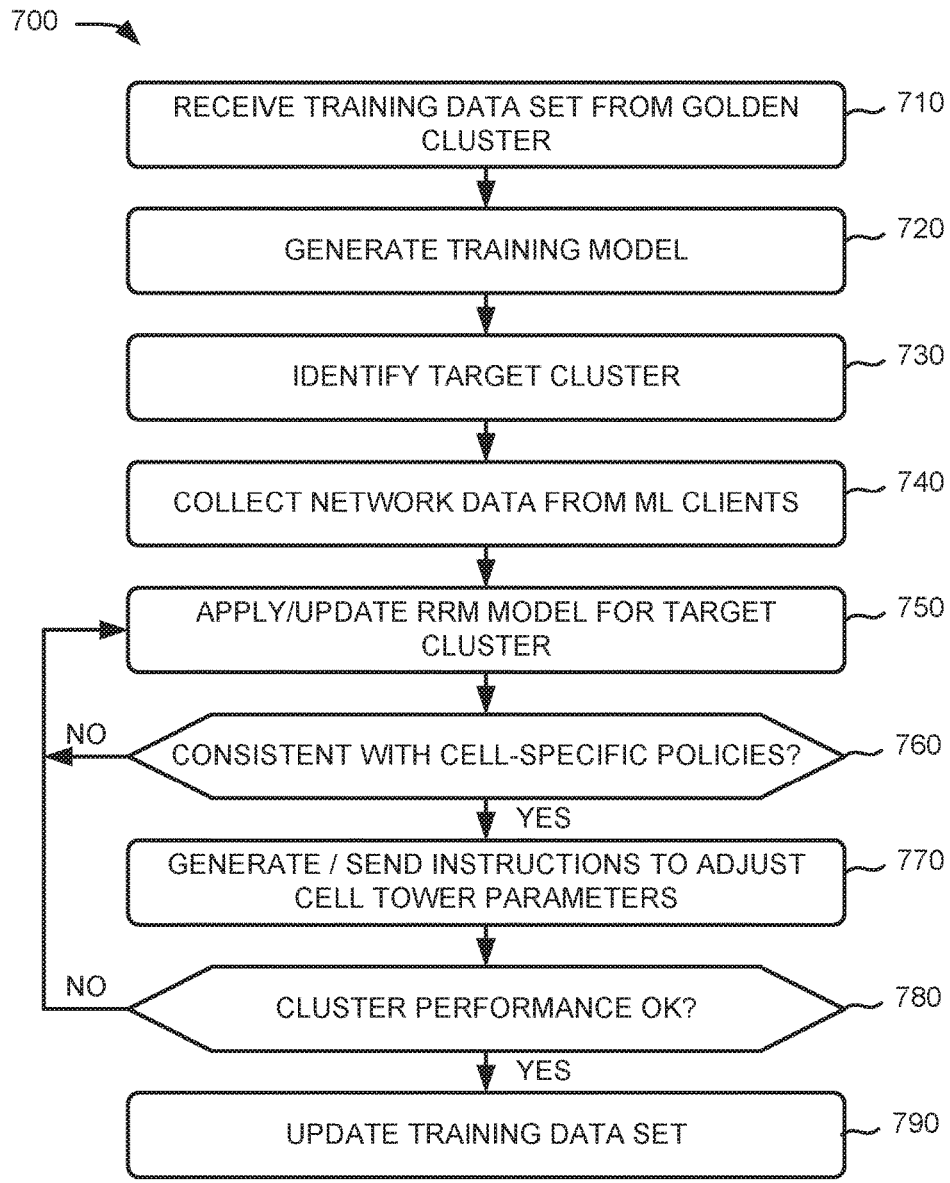
FIG. 7 is a flowchart of a process for performing RF optimization according to an implementation described herein.

FIG. 7 is a flow diagram illustrating an exemplary process 700 for performing RF optimization, according to an implementation described herein. In one implementation, process 700 may be performed by RF optimization platform 150 and cell towers 110. In another implementation, some or all of process 700 may be performed by another device or group of devices in network environment 102.

As shown in FIG. 7, process 700 may include receiving a training data set from a golden cluster (block 710) and generating a training model (block 720). For example, a well-performing cluster may be identified base on, for example, consistent adherence to key performance indicators (KPIs). The golden cluster may be selected, for example, using a selection algorithm in RF optimization platform 150, manual selection, or another selection method. A training model may be extracted using a training data set from the golden cluster. RF optimization platform 150 may extract a model from the training data set with applications to monitoring, optimization and auto tuning network functionalities. The model may provide closed form expressions that approximate the functional relations between KPIs and RRM parameters. The model can help anticipate the behavior of a network sub-system to new values of RAN parameters.

Process 700 may also include identifying a target cluster (block 730). For example, RF optimization platform 150 may cluster cell towers 110 and/or UEs 140 into groups according commonalties such as channel conditions, position, applications, and hardware resources. The target cluster 105 may be identified as a cluster requiring improved network performance, network load distribution, and/or user satisfaction. A target cluster 105 may include, for example, a group of cell towers 110 detected to have KPI deviations (e.g., as reported by ML clients 310 and/or monitored by network 130), a group of cell towers 110 that may be impacted by addition/subtraction of another local cell tower 110, a group of cell towers 110 that are selected for auditing, etc.

Process 700 may further include collecting network data from ML clients in the target cluster (block 740). For example, ML engine 320 (or ML engine 340) may instruct ML clients 310 (e.g., ML clients 310 on the UEs 140 connected to cell towers 110 of target cluster 105) to report network parameters, such as RSRP and RSRQ data in relation to a UE location. In one implementation, ML engine 320 (or ML engine 340) may select a portion (e.g., a percentage or fixed number) of ML clients 310 for reporting (e.g., to prevent network disruption, etc.).

Process 700 may further include applying a RRM model for the target cluster (block 750) and checking the RRM model for consistency and cell-specific policies (block 760). For example, ML engine 320 (or ML engine 350) may translate the training model to include specific cell towers 110 in target cluster 105 and optimize settings for cell towers 110 in target cluster 105. Policies and controls for each cell tower 110 may be obtained and evaluated against the RRM model for compliance. For example, cell-specific policies may reserve resources for particular applications or subscribers. Furthermore, the RRM model may be compared against existing target cluster 105 data to verify application of the RRM model will reduce interference, reduce overshooting, and/or reduce handovers between cell towers 110 (e.g., within target cluster 105).

If the RRM model is not consistent or does not comply with cell-specific policies (block 760—No), process 700 may return to block 750 to update the RRM model for the target cluster. If the RRM model is consistent and complies with cell-specific policies (block 760—Yes), process 700 may include generating and sending instructions to adjust cell parameters in the target cluster (block 770). For example, RF optimization platform 150 may provide instruction signals to an OSS and/or instruction text (e.g., email, text message, instant message, etc.) to site operators for cell towers 110 to adjust cell tower 110 settings, such as antenna tilt, power levels, cell tower discovery rules, etc.

Process 700 may further include determining if the target cluster performance is acceptable (block 780). For example, RF optimization platform 150 may apply a probability function for one or more KPIs may be applied to actual network data (e.g., received from ML clients 310) to asses viability of the RRM model. Additionally, or alternatively, after updated RAN parameters are implemented at target cluster 105, ML engine 320 (or ML engine 340) may instruct ML clients 310 to report network parameters, such as RSRP and RSRQ data in relation to a UE location. RF optimization platform 150 may monitor the reported UE 140 parameters along with other network 130 parameters to verify acceptable/improved performance of target cluster 105.

If the target cluster performance is not acceptable (block 780—No), process 700 may return to block 750 to update the RRM model for the target cluster. If the target cluster performance is acceptable (block 780—Yes), process 700 may include updating the training data set (block 790). For example, in one implementation, RF optimization platform 150 may update the training data set from the golden cluster to reflect learning from implementing the RRM model for target cluster 105.

Figure 8:
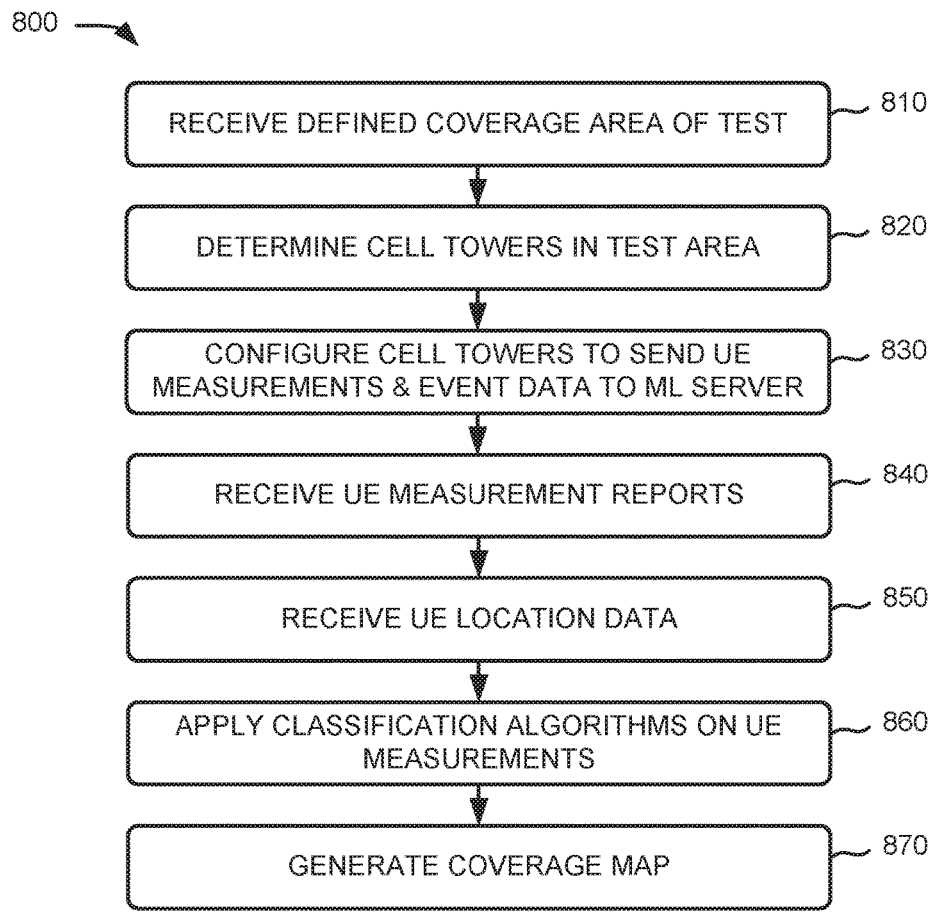
FIG. 8 is a flowchart of a process for generating a coverage map according to an implementation described herein.

FIG. 8 is a flow diagram illustrating an exemplary process 800 for generating a coverage map, according to an implementation described herein. The process of FIG. 8 may also be referred to as a virtual drive test. In one implementation, process 800 may be performed by RF optimization platform 150. In another implementation, some or all of process 800 may be performed by RF optimization platform 150 in conjunction with another device or group of devices, such as cell tower 110 and UE 140.

As shown in FIG. 8, process 800 may include receiving a defined area for a test (block 810) and determining cell towers in the test area (block 820). For example, RF optimization platform 150 may receive, from an operator, an indication of a geographic area to be tested for RAN coverage. In one implementation, a user interface with a map may be used to indicate an area. In another implementation, boundary coordinates, zip code boundaries, or municipal boundaries may be used to indicate a coverage test area. RF optimization platform 150 may receive the coverage test area definition and identify cell towers 110 in the test area. For example, RF optimization platform 150 may use latitude and longitude coordinates, GPS coordinates, or other location information for cell towers 110 to identity cell towers 110 within the target area.

Process 800 may also include configuring cell towers to send UE measurements and event data to an ML server (block 830) and receiving UE measurement reports (block 840). For example, referring to FIG. 3B, ML engine 350 may instruct ML engines 340 in applicable cell towers (e.g., within the target area) to provide UE measurements and event data via IMRP 370. ML engine 340 may, in turn, instruct ML clients 310 (e.g., ML clients 310 on the UEs 140 connected to the applicable cell towers 110) to report network measurements and event data via MLRP 360, such as RSRP and RSRQ data in relation to a UE location. ML engine 340 may receive the reported data from ML client 310 and forward UE measurement reports to ML engine 350. ML engine 350 may receive the UE measurement reports, which may include a separate UE measurement report from each cell tower 110 in the target area.

Process 800 may also include receiving UE location data (block 850). For example, RF optimization platform 150 may receive GPS location data from UE 140 (e.g., for subscribers that have opted into location-based services). UE location data may include, for example, location coordinates and corresponding times of UE 140. In one implementation, location data may be included with network measurements and event data from ML client 310 and then included in UE measurement reports from each cell tower 110. In another implementation, UE location data may be collected separately and cross-referenced to network measurements and event data.

Process 800 may further include applying classification algorithms on UE measurements (block 860) and generating a coverage map (block 870). For example, ML engine 350 may apply UE measurement reports and UE location data to algorithms to identify signal strength at coordinates within the target area. In one implementation, the algorithms may extrapolate actual signal strength data to provide RF coverage estimates for coordinates without actual signal strength data. ML engine 350 may provide a complete signal strength profile for the target area based on the classification algorithms and convert the signal strength profile into a coverage map for the target area. The coverage map may include, for example, a geographical map view with an overlay of color-coded signal strengths for the target area.

Figure 9:
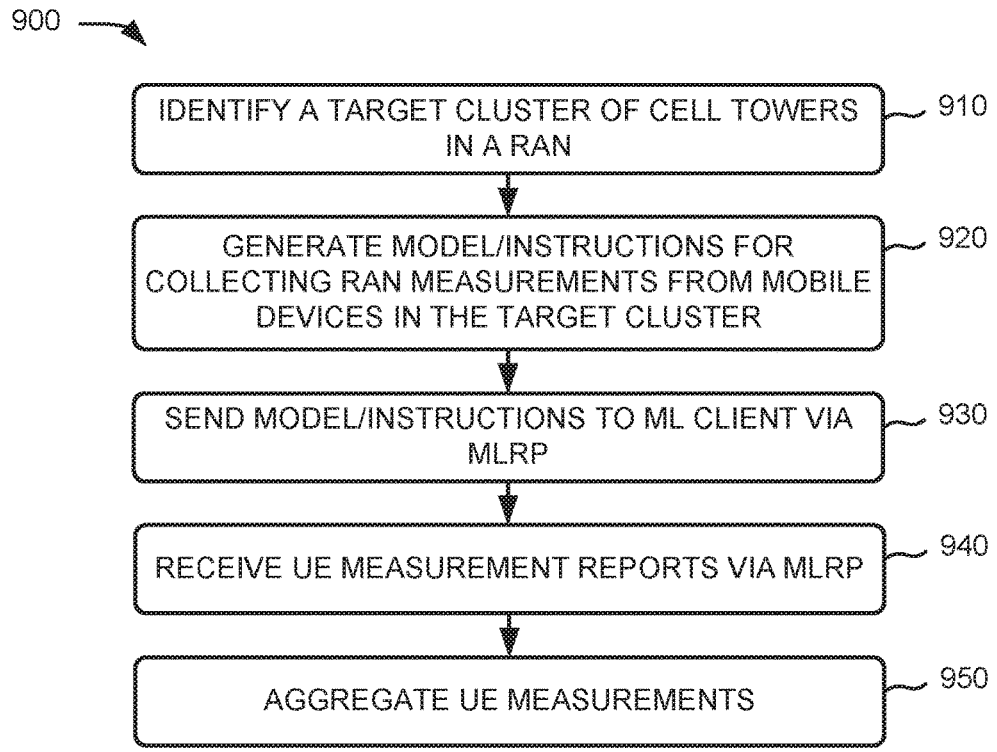
FIG. 9 is a flowchart of a process for obtaining reference signal measurements over a structured interface according to an implementation described herein.

FIG. 9 is a flow diagram illustrating an exemplary process 900 for obtaining UE reference signal measurements over a structured interface, according to an implementation described herein. In one implementation, process 900 may be performed by RF optimization platform 150. In another implementation, some or all of process 900 may be performed by RF optimization platform 150 in conjunction cell towers 110 and UE 140s.

As shown in FIG. 9, process 900 may include identifying a target cluster of cell towers in a RAN (block 910). For example, a target cluster of cell towers may be identified based on detected deviation from a KPI or designation of a geographic boundary of interest (e.g., where the target cluster includes the bases stations servicing the geographic boundary).

Process 900 may also include generating a model or instructions for collecting RAN measurements from mobile devices in the target cluster (block 920) and sending the model/instructions to ML clients via a MLRP (block 930). For example, RF optimization platform 150 may generate a model (e.g., based on training data) to identify optimization opportunities within the target cluster. The model may be dependent on certain parameters, such as UE reference signal measurements and other network measurements. RF optimization platform 150 may provide the model, or instructions to support data collection for the model, to ML clients 310 on UEs 140. In one implementation, the model or instructions may be provided via MLRP 330. In another implementation, the model or instructions may be provided from RF optimization platform 150 to cell tower 110 via IMRP 370 and then from cell tower 110 to UE 140 via MLRP 360. The model/instruction may direct some or all applicable ML clients 310 (e.g., ML clients 310 on the UEs 140 connected to the relevant cell towers 110) to collect and report network measurements, such as RSRP and RSRQ data. In one implementation, ML clients 310 may be directed to provide RSRP and RSRQ data in relation to a corresponding UE 140 location.

Process 900 may further include receiving UE measurement reports via the MLRP or an IMRP (block 940), and aggregating the UE measurements (block 950). For example, RF optimization platform 150 (ML engine 320) may receive the reported data from ML client 310 directly or, alternatively, via ML engine 350 may receive consolidated reports from ML engine 340 in cell tower 110. That is, ML engine 340 may aggregate UE data received via MLRP 360 before forwarding the aggregated UE data to ML engine 350 via IMRP 370. ML engine 350 may receive the UE measurement reports, which may include a separate UE measurement report from each cell tower 110 in the target area. RF optimization platform 150 may aggregate the measurement reports into a compilation for the entire target cluster.

According to an implementations described herein, a method is provided for obtaining reference signal measurements over a structured interface to support RF optimization via machine learning. The method, performed by a network device, may include identifying a target cluster of cell towers for a radio access network (RAN); generating a model for collecting RAN measurements from mobile communication devices in the target cluster; and sending the model via a structured reference point to client applications on the mobile communication devices. The model may direct collection of and sending of the RAN measurements by the client applications. The method may further include receiving, via the structured reference point, the RAN measurements from the client applications based on the model; and aggregating the RAN measurements to represent aspects of the target cluster based on the model.

Adoption as an industry standard of the MLRP and IMRP interface described herein may enable wireless service providers to employ a client-server architecture where UEs can provide user experience data (e.g., RSRP, RSRQ, etc.) to support artificial neural-network based RF optimization.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIGS. 7-9, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic," a "component," or an "element." The logic, the component, or the element, may include, for example, hardware (such as a processor, an ASIC, or a FPGA) or a combination of hardware and software. The embodiments have been described without reference to the specific software code since the software code can be designed to implement the embodiments based on the description herein and commercially available software design environments and/or languages.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such.

What is claimed is:

1. A method, comprising:
   identifying, by a network device, a target cluster of cell towers for a radio access network (RAN), wherein the identifying the target cluster includes:
      receiving an indication of a geographic boundary, and
      identifying the cell towers with coverage areas within the geographic boundary;
   generating, by the network device, a model for collecting RAN measurements from mobile communication devices that connect to the cell towers in the target cluster;
   sending, by the network device and to client applications on the mobile communication devices, the model,
      wherein the model directs collection of and sending of the RAN measurements by the client applications, and
      wherein the sending of the RAN measurements includes sending the RAN measurements via a structured reference point;
   receiving, by the network device, the RAN measurements from the client applications based on the model, wherein the receiving includes receiving the RAN measurements via the structured reference point; and
   aggregating, by the network device, the RAN measurements to represent aspects of the target cluster based on the model.

2. The method of claim 1, wherein identifying the target cluster further includes:
   identifying the target cluster of cell towers for optimization based on measured deviations from a key performance indicator for the RAN.

3. The method of claim 2, wherein the RAN is a self-organizing network and wherein the network device provides instructions for radio frequency (RF) optimization of the target cluster based on the aggregating.

4. The method of claim 1, wherein the RAN measurements from the mobile communication devices include Reference Signal Received Power (RSRP) and Reference Signal Received Quality (RSRQ) data.

5. The method of claim 1, wherein the model provides one of location-based or time-based guidelines for collecting the RAN measurements.

6. The method of claim 1, wherein receiving the RAN measurements from the client applications includes:
   receiving, at cell towers in the target cluster, the RAN measurements;
   collecting, by the cell towers, the RAN measurements; and
   forwarding, to the network device, the collected RAN measurements by the cell towers.

7. The method of claim 6, further comprising:
   receiving, by the network device, a training data set from a well-performing cluster of cell towers in the RAN; and
   generating, by the network device, an optimization model based on the training data set.

8. The method of claim 7, further comprising:
   applying, by the network device, the collected RAN measurement to the optimization model; and
   sending, by the network device and based on the applying, instructions to adjust settings of the cell towers in the target cluster.

9. The method of claim 8, wherein the instructions to adjust settings include:
   instructions to adjust antenna tilt for a remote electrical tilting (RET) antenna, or
   instructions to adjust a transmission power level.

10. The method of claim 7, further comprising:
    applying the collected RAN measurement to the optimization model;
    determining when performance of the target cluster is acceptable; and
    updating the training data set when the performance of the target cluster is acceptable.

11. The method of claim 10, wherein determining when performance of the target cluster is acceptable comprises:
applying a probabilistic function to predict a key performance indicator (KPI) value for the target cluster based on the collected RAN measurements.

12. A system, comprising:
a network device for a wireless network, the network device including a memory and a processor to execute instructions in the memory to:
identify a target cluster of cell towers for a radio access network (RAN), wherein identifying the target cluster includes:
receiving an indication of a geographic boundary, and
identifying the cell towers with coverage areas within the geographic boundary;
generate a model for collecting RAN measurements from mobile communication devices that connect to the cell towers in the target cluster;
send, to client applications on the mobile communication devices, the model, wherein the model directs collection of and sending of the RAN measurements by the client applications, and wherein the sending of the RAN measurements includes sending the RAN measurements via a structured reference point;
receive, via the structured reference point, the RAN measurements from the client applications based on the model; and
aggregate the RAN measurements to represent aspects of the target cluster based on the model.

13. The system of claim 12, wherein the aspects of the target cluster include a coverage map.

14. The system of claim 12, wherein the aspects of the target cluster include cell interference.

15. The system of claim 12, wherein the RAN measurements from the mobile communication devices include Reference Signal Received Power (RSRP) and Reference Signal Received Quality (RSRQ) data associated with a location of a mobile communication device.

16. The system of claim 12, wherein the instructions further cause the processor to:
apply the collected RAN measurement to an optimization model; and
send, based on the applying, instructions to adjust settings of the cell towers in the target cluster.

17. A non-transitory computer-readable medium storing instructions executable by a computational device to:
identify a target cluster of cell towers for a radio access network (RAN);
generate a model for collecting RAN measurements from mobile communication devices that connect to cell towers in the target cluster;
send, to client applications on the mobile communication devices, the model, wherein the model directs collection of and sending of the RAN measurements by the client applications, and wherein the sending of the RAN measurements includes sending the RAN measurements via a structured reference point;
receive, via the structured reference point, the RAN measurements from the client applications based on the model wherein receiving the RAN measurements from the client applications includes:
receiving, at cell towers in the target cluster, the RAN measurements,
collecting, by the cell towers, the RAN measurements, and
forwarding, to a network device, the collected RAN measurements by the cell towers;
aggregate the RAN measurements to represent aspects of the target cluster based on the model;
receive a training data set from a well-performing cluster of cell towers in the RAN;
generate an optimization model based on the training data set;
apply the collected RAN measurement to the optimization model;
determine when performance of the target cluster is acceptable; and
update the training data set when the performance of the target cluster is acceptable.

18. The non-transitory computer-readable medium of claim 17, wherein the instructions to identify the target cluster include instructions to:
identify the target cluster of cell towers for optimization based on measured deviations from a key performance indicator for the RAN.

19. The non-transitory computer-readable medium of claim 17, further comprising instructions to:
send, based on the applying, instructions to adjust settings of the cell towers in the target cluster.

20. The non-transitory computer-readable medium of claim 19, wherein the instructions to adjust settings of the cell towers include instructions for inter-cell interference coordination.

* * * * *